(12) United States Patent
Koenning et al.

(10) Patent No.: US 11,646,961 B2
(45) Date of Patent: May 9, 2023

(54) SUBSCRIBER-AWARE NETWORK CONTROLLER

(71) Applicant: F5 Networks, Inc., Seattle, WA (US)

(72) Inventors: Christian Josef Koenning, Englefield Green (GB); Bart Salaets, Hallaar (BE); Manjunath Jagannatharao, Santa Clara, CA (US)

(73) Assignee: F5, Inc., Seattle, WA (US)

( * ) Notice: Subject to any disclaimer, the term of this patent is extended or adjusted under 35 U.S.C. 154(b) by 0 days.

(21) Appl. No.: 16/794,390

(22) Filed: Feb. 19, 2020

(65) Prior Publication Data

US 2021/0258248 A1    Aug. 19, 2021

(51) Int. Cl.
  *H04L 45/302*    (2022.01)
  *H04L 45/00*    (2022.01)

(52) U.S. Cl.
  CPC ............ *H04L 45/308* (2013.01); *H04L 45/56* (2013.01)

(58) Field of Classification Search
  CPC .............................. H04L 45/308; H04L 45/56
  See application file for complete search history.

(56) References Cited

U.S. PATENT DOCUMENTS

| | | | |
|---|---|---|---|
| 8,596,169 B2 | 12/2013 | Wang | |
| 9,350,661 B2 | 5/2016 | Murphy et al. | |
| 9,450,817 B1 | 9/2016 | Bahadur et al. | |
| 9,621,453 B1 | 4/2017 | Pani et al. | |
| 9,742,664 B2 | 8/2017 | Carson et al. | |
| 10,397,316 B2 | 8/2019 | Bharrat et al. | |
| 2014/0229945 A1 | 8/2014 | Barkai et al. | |
| 2015/0043576 A1* | 2/2015 | Dixon | H04L 12/184 370/390 |
| 2016/0150448 A1* | 5/2016 | Perras | H04W 36/12 455/450 |
| 2017/0026422 A1 | 1/2017 | Klein et al. | |
| 2018/0077229 A1* | 3/2018 | Bharrat | H04L 65/1006 |
| 2018/0337849 A1* | 11/2018 | Sharma | H04L 43/026 |
| 2018/0337862 A1* | 11/2018 | Sharma | H04L 43/087 |

OTHER PUBLICATIONS

F5 Networks, BIG-IP Policy Enforcement Manager Datasheet, available at: https://www.f5.com/pdf/products/big-ip-policy-enforcement-manager-datasheet.pdf, (2016) 8 pages.

(Continued)

*Primary Examiner* — Jung H Park
(74) *Attorney, Agent, or Firm* — Troutman Pepper Hamilton Sanders LLP (F5 In-House)

(57) ABSTRACT

Technology related to processing network packets in a subscriber-aware manner is disclosed. In one example, a method includes selecting one or more subscribers to move from a first network processing node to a second network processing node. In response to the selection, subscriber data associated with the one or more subscribers can be programmed at the second network processing node. After the subscriber data associated with the one or more subscribers is programmed on the second network processing node, a software defined network (SDN) switch can be reprogrammed to forward network traffic having network addresses associated with the one or more subscribers to the second network processing node instead of the first network processing node.

20 Claims, 9 Drawing Sheets

(56) References Cited

OTHER PUBLICATIONS

F5 Networks, Horizontal Scale BIG-IP Device Service Cluster (DSC) with Software Defined Networking (SDN) enabled Hardware, available at: https://devcentral.f5.com/s/articles/horizontal-scale-big-ip-device-service-cluster-dsc-with-software-defined-networking-sdn-enabled-hardware-17286, Jan. 25, 2016, 7 pages.
F5 Networks, F5 SDN Scale using OpenFlow 1.3 or ARISTA EOS Directflow via EOS SDK, available at: https://github.com/f5devcentral/SdnScale, Jul. 18, 2016, 1 page.
European Search Report for corresponding EP Application No. 21158113.7, dated Jul. 8, 2021.
Hamza, El Bouatmani et al., "A Scalable SDN-EPC Architecture Based on OpenFlow-enabled Switches to Support Inter-Domain Handover", 10th International Conference on Innovative Mobile and Internet Services in Ubiquitous Computing, pp. 272-277, Jul. 6, 2016.

\* cited by examiner

SUBSCRIBER-AWARE NETWORK CONTROLLER

FIELD

This technology generally relates to network traffic management, and more specifically to controlling a network processing system in a subscriber-aware manner.

BACKGROUND

A software application can be distributed or partitioned across different computing devices. For example, a client-server architecture can partition tasks between a client device (such as a laptop or mobile device) and one or more application server computers connected by an interconnection network (such as the Internet). The interconnection network can include a carrier network that is managed by a telecommunications service provider (such as a wireless service provider), and a user of the client device can be a subscriber of the carrier network. The application server computer(s) can execute software applications to provide virtual resources, software services, and/or content to the client devices. For example, client devices can initiate communication sessions with the application server computers by sending requests over the interconnection network to the application server computers, and the servers can respond to the requests. As the number of client devices seeking access to the interconnection network or the application server computers increases, intermediary computing devices, such as network traffic management computing device(s), can be added between the client devices and the application server computers. Network traffic management computing device(s) can perform security, processing, and/or routing functions of the client-server architecture, such as encrypting and/or decrypting traffic between the client and the application server. A telecommunications service provider can use a network traffic management computing device to manage the network traffic of their subscriber-base and for individual subscribers. A network traffic management computing device can potentially increase the scalability, availability, security, and/or performance of the client-server architecture. However, as the complexity of applications increases and the number of interconnected devices increases, there can be many challenges in implementing a high performance, highly available, and secure client-server architecture including an intermediary computing device.

BRIEF SUMMARY

Generally, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One example includes a method implemented in cooperation with a network traffic management system including one or more software defined network switches, network processing nodes, or server modules. The method includes selecting one or more subscribers to move from a first network processing node to a second network processing node. The method also includes, in response to the selection, programming subscriber data associated with the one or more subscribers at the second network processing node. The method also includes after the subscriber data associated with the one or more subscribers is programmed on the second network processing node, reprogramming a software defined networking (SDN) switch to forward network traffic having network addresses associated with the one or more subscribers to the second network processing node instead of the first network processing node.

Other embodiments incorporating this example include corresponding computer systems, apparatus, and computer programs recorded on one or more non-transitory computer readable media (e.g., computer storage devices), each configured to perform the actions of the methods. An example computer system includes one or more network traffic management modules, networking modules, or server modules, memory comprising programmed instructions stored thereon, and one or more processors configured to be capable of executing the stored programmed instructions to perform the actions of the methods. An example non-transitory computer readable medium having stored thereon instructions for managing network traffic in a subscriber-aware manner, the instructions comprising executable code that, when executed by one or more processors, causes the processors to perform the actions of the methods. An example network traffic management apparatus includes memory comprising programmed instructions stored thereon and one or more processors configured to be capable of executing the stored programmed instructions to perform the actions of the methods.

DETAILED DESCRIPTION

Introduction

Figure 1:
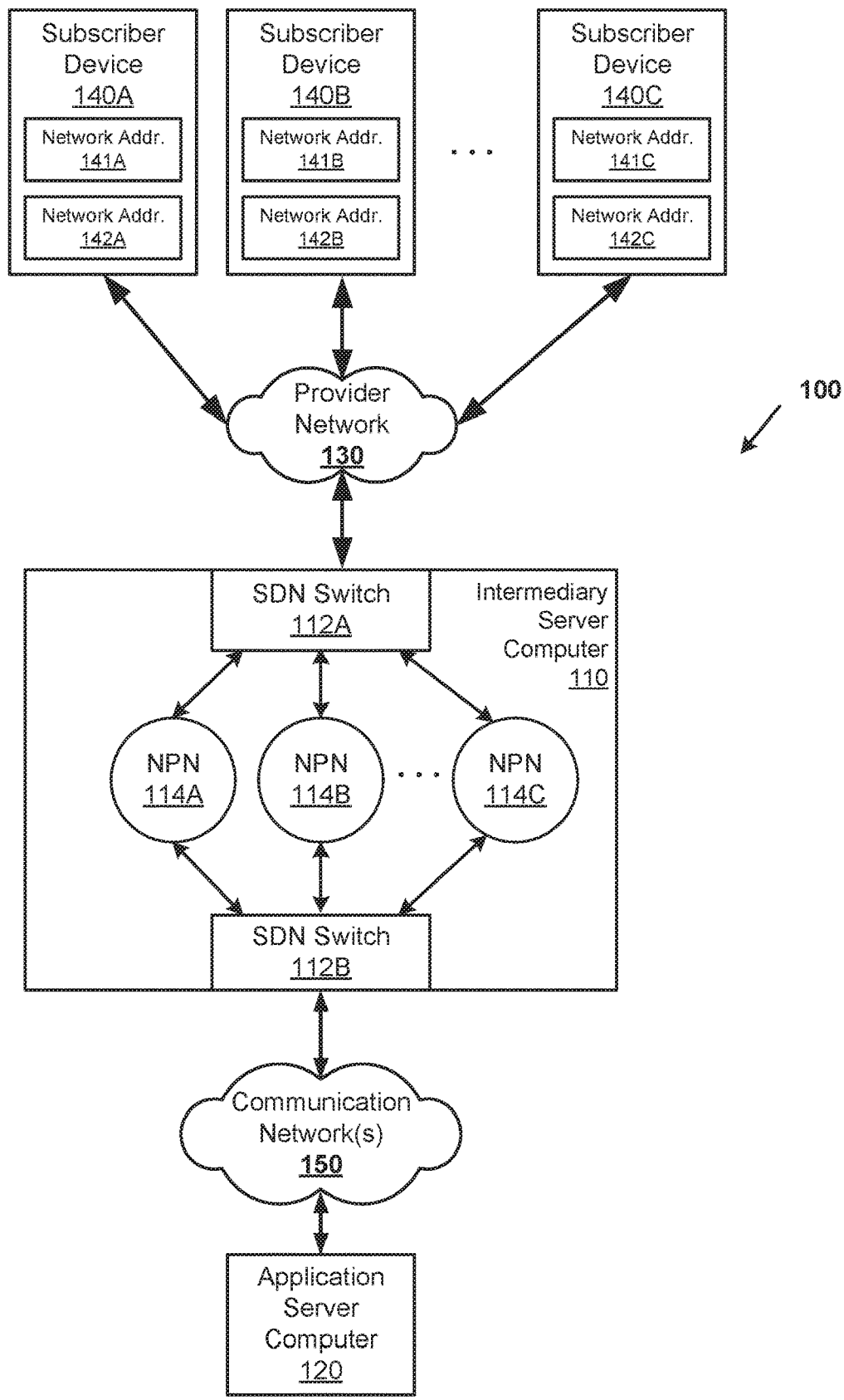
FIG. 1 is a block diagram of an example client-server architecture including an intermediary server computer including a software defined networking (SDN) switch and network processing nodes for controlling network traffic in a subscriber-aware manner.

A telecommunications service provider can provide a carrier network for use by its subscribers. A subscriber is an entity that pays to receive a service, such as the service of being connected to and passing information through a carrier network. For example, the subscriber can access the carrier network using one or more client devices that are operated by the subscriber. As the number of subscribers and the amount of information passed by the subscribers increases, the hardware and software resources of the carrier network will be increased to accommodate the additional subscribers and network traffic. By efficiently using the resources of the carrier network, the costs to operate the network can be reduced. The telecommunications service provider can control the usage of the carrier network by setting policies for using the network. For example, the policies can include bandwidth quotas for various types of network traffic and/or for different subscribers. To implement these policies, the network traffic of the subscribers can be monitored and/or processed.

In one architecture, the network traffic of the different subscribers can be aggregated through one or more network devices, processed, and then forwarded to the intended destinations (e.g., an application server) of the network traffic. As used herein, network traffic can include one or more network packets that are sent from or addressed to one or more subscribers. The network traffic of a given subscriber includes one or more network packets that are sent from or addressed to the given subscriber. Processing the network traffic can include performing accounting operations and applying policies to determine whether and how the network traffic is forwarded through the network. To increase the number of subscribers that can use the network, the aggregated network traffic can be distributed to a number of network processing nodes. A network processing node is a computing element (e.g., hardware, software, or a combination thereof) that can transmit and/or receive a network packet. A processing node can be transparent to the subscriber and positioned as an intermediate destination between the subscriber and the source or destination of the network packet. For example, the processing node can be a network device and/or computer that is interposed in the path of network traffic of the subscriber.

One solution for distributing network traffic to a number of processing nodes is to use an equal-cost multi-path (ECMP) routing algorithm to distribute the network traffic to the different processing nodes. For example, multiple fields in a network packet can be used to determine the processing node used to process the network packet. As a specific example, a five-tuple including the source address, destination address, source port, address port, and protocol fields can be used as inputs to a hash function, and the output of the hash function can be used to select the path (e.g., the processing node) of the network packet. However, ECMP routing can cause the network traffic of a given subscriber to be processed by different processing nodes. When the network traffic of a given subscriber is processed by different processing nodes, synchronization logic may be added to the system to handle synchronization issues (such as races and deadlocks) that could potentially occur when the different processing nodes attempt to access a subscriber database concurrently. The synchronization logic can cause a system to be more complicated and cause the system to be less efficient compared to a system that operates without the synchronization logic. The subscriber database can include routing policies for the subscriber, accounting information (e.g., a bandwidth quota and current usage information) of the subscriber, and so forth. Additionally, the subscriber database can become a bottleneck as different processing nodes attempt to access the subscriber database simultaneously or in close succession. When processing nodes are added to an ECMP architecture, such as to add capacity to the network, the processing nodes for processing subscriber traffic can change which can potentially create "control spikes" as the processing nodes gather control information used to route the network traffic. The control spikes can increase the performance criteria of the host of the subscriber database, increase packet processing time, and/or cause packets to get dropped.

As described herein, a network traffic management system can include distributed control logic that can potentially simplify synchronization logic and reduce control spikes and the likelihood of dropped packets. The network traffic management system can include one or more software defined networking (SDN) switches in communication with a cluster of network processing nodes. SDN uses a separate data plane and control plane, and logically centralized control logic for determining a path for network traffic through the network. SDN contrasts with conventional management of network traffic that uses distributed routing protocols (such as Open Shortest Path First (OSPF) and Border Gateway Protocol (BGP)) across multiple network devices to determine a path for network traffic through the network. As one example, one of the networking processing nodes of the cluster can be randomly selected to be configured as a controller handling the data plane distribution by sending the appropriate forwarding rules to the SDN switch.

The SDN switch can receive aggregated subscriber network traffic and distribute the network traffic to the different network processing nodes so that network traffic for a given subscriber will consistently be processed by the same network processing node. For example, based upon a configurable distribution election algorithm, the system can pre-configure the system with control information to deterministically distribute the network traffic of the different subscribers to respective network processing nodes. Specifically, the SDN switch can be programmed to forward all network traffic for a given subscriber to the same network processing node. The SDN switch disaggregates the aggregated network traffic so that the network traffic of the different subscribers is spread across the different network processing nodes. Each network processing node can be programmed with control information for a group of subscribers. For example, the source and/or destination network address can be used as a primary key into a subscriber database that includes information about the subscribers, such as accounting information and policies for forwarding network traffic of the subscribers. The subscriber database can be distributed across the network processing nodes so that each network processing node can process network traffic without synchronizing with and waiting for the other network processing nodes. The subscriber database can be integrated with external control plane systems, such as Third Generation Partnership Project (3GGP), Policy and Charging Rules Function (PCRF), or Remote Authentication Dial-In User Service (RADIUS) accounting servers. The control plane controller can use the same dataset used for the data plane traffic distribution used by the data plane controller, and therefore can direct the appropriate control plane messages to the network processing system handling the subscriber, based upon the compiled subscriber database. When scaling the system up or down (e.g., adding or removing network processing nodes), the knowledge of subscriber locality can be used to gracefully migrate coherent sets of subscribers between different network processing entities without causing service interruption.

As one example, the network traffic management system can implement a method that includes selecting one or more subscribers to move from a first network processing node to a second network processing node. In response to the selection, subscriber data associated with the one or more subscribers can be programmed at the second network processing node. After the subscriber data associated with the one or more subscribers is programmed on the second network processing node, an SDN switch can be reprogrammed to forward network traffic having network addresses associated with the one or more subscribers to the second network processing node instead of the first network processing node. Aggregated network traffic can be received at the SDN switch. The SDN switch can be used to disaggregate the aggregated network traffic. For example, the SDN switch can forward network traffic of the one or more subscribers to the second network processing node. Prior to the network traffic of the one or more subscribers reaching its intended destination, the network traffic of the one or more subscribers can be processed at the second network processing node.

Example Architectures for Subscriber-Aware Network Controllers

FIG. 1 is a block diagram of an example client-server architecture 100 including an intermediary server computer 110 including one or more SDN switches (e.g., SDN switches 112A-B) and multiple network processing nodes (e.g., NPN 114A-C). Specifically, FIG. 1 illustrates how network traffic between subscriber devices 140 and an application server computer 120 can be forwarded by the intermediary server computer 110. The client-server architecture 100 can include the intermediary server computer 110, the application server 120, communication networks 130 and 150, the subscriber devices 140A-C. The client-server architecture 100 can be implemented using a client-server architecture as described in more detail with reference to FIG. 8, where the different components (110, 120, 130, 140, 150) of the client-server architecture can be implemented using a computing environment as described in more detail with reference to FIG. 9.

The subscriber devices 140A-C can connect to external communication network(s) 150 via the provider network 130 and the intermediary server computer 110. For example, the subscriber device 140A and the application server 120 can communicate via the communication networks 130 and 150 and the intermediary server computer 110. Specifically, requests from the subscriber device 140A can be forwarded through the provider network 130 to the intermediary server computer 110 to the application server 120 using the communication network(s) 150. As one example, the intermediary server computer 110 can act as a gateway for the subscriber devices 140A-C to reach public networks, such as the Internet. For example, the intermediary server computer 110 can be managed by an Internet Service Provider (ISP), a telecommunications service provider, or other provider that connects clients (e.g., the subscriber devices 140A-C) to networks external to the provider (e.g., public networks). The subscriber device 140A can be assigned multiple network addresses, such as the network addresses 141A and 142A. For example, when the subscriber device 140A is connected to the provider network 130, a protocol such as Dynamic Host Configuration Protocol (DHCP) can be used to assign the network addresses 141A and 142A to the subscriber device 140A. A DHCP server (not shown) connected to the provider network 130 can allocate network addresses so that each of the subscriber devices 140A-C has a unique network address while the subscriber devices 140A-C are simultaneously active on the provider network 130. Specifically, all of the network addresses 141A-C and 142A-C are allocated so that they are different from each other. As one example, the network addresses 141A and 142A can be addresses for different communication protocols, such as Internet Protocol (IP) version four (IPv4) and IP version six (IPv6). As another example, the network addresses 141A and 142A can be different addresses for the same communication protocol.

Each of the subscriber devices 140A-C (also referred to as a client device 140) can be a computing device capable of sending network traffic over a communications network (e.g., networks 130 and 150). For example, each of the subscriber devices 140A-C can be a mobile computing device, a desktop computing device, a laptop computing device, a tablet computing device, a virtual machine executing on a cloud-based computing environment, and so forth. The client device 140 can execute an agent (e.g., a browser or other software application) that requests a service provided by the application server 120. For example, the agent can generate requests that are transmitted by the client device 140 using a connectionless communication protocol (e.g., User Datagram Protocol (UDP)) or a connection-oriented communication protocol (e.g., Transmission Control Protocol (TCP)). Each of the server computers of the application server 120 can be computing devices capable of sending network traffic over a communications network (e.g., the network 150) and processing requests by client devices (such as the subscriber devices 140A-C). The server computer 120 can include multiple hardware and/or software server resources (not shown), a virtual machine executing on a cloud-based computing environment, and so forth. The application server 120 can execute a server software application, such as an HTTP server application or a secure shell (SSH) server application, for example.

The intermediary server computer 110 can include computer hardware, software, or a combination thereof. For example, the intermediary server computer 110 can include one or more SDN switches (e.g., SDN switches 112A-B) and multiple network processing nodes (e.g., NPN 114A-C). As one example, the SDN switch 112A can receive aggregated subscriber network traffic from the subscriber devices 140A-C and disaggregate the network traffic by sending the network traffic of different subscribers to different respective network processing nodes. As a specific example, the network traffic of subscriber device 140A can be processed by NPN 114A, the network traffic of subscriber device 140B can be processed by NPN 114B, and the network traffic of subscriber device 140C can be processed by NPN 114C. The SDN switch 112A can make the forwarding decision based on a network address of the network traffic which can be more efficient than performing deep packet inspection and basing the forwarding decision on more complex criteria. For egress traffic from the subscriber devices 140A-C, the SDN switch 112A can make the forwarding decision based on a source network address and for ingress traffic from the communications network 150, the SDN switch 112A can make the forwarding decision based on a destination network address of the network traffic.

Different kinds of traffic for the same subscriber can be processed by the same network processing node. For example, IPv4 and IPv6 traffic of the same subscriber can be processed on the same network processing node. The SDN switch 112B can receive aggregated subscriber network traffic from the application server 120 and disaggregate the network traffic by sending the network traffic of different subscribers to different respective network processing nodes. In this manner, both requests initiated by the subscriber devices 140A-C and responses that are destined for the subscriber devices 140A-C can be processed by the same network processing node. As another example, a single SDN switch having two network interfaces (e.g., an interface to the provider network 130 and an interface to the external network 150) can disaggregate the aggregated network traffic and forward the network traffic of the individual subscribers to the respective network processing node.

The intermediary server computer 110, and the network processing nodes in particular, can perform various proxy and other services, such as policy enforcement, load balancing, rate monitoring and metering, caching, denial of service protection, encryption/decryption, session management, address translation, and/or access control, for example. For example, the intermediary server computer 110 can act as a proxy for one or more of the subscriber devices 140A-C. A proxy is an agent that is situated in a path of communication between a client (e.g., the client device 140) and a server (e.g., the application server 120) that can intercept communications (e.g., network packets, frames, datagrams, and messages) between the client and the server. The intermediary server computer 110 can present a network address of the proxy as the network address for one or more of the subscriber devices 140A-C.

Each network processing node (e.g., any of the NPN 114A-C) can perform processing tasks that are transparent to the subscribers and/or that occur prior to the network traffic reaching its intended destination. The intended destination can be a host having the address that matches the destination address of the network packet. For example, the network processing nodes can enforce network policies of the of the provider. The network policies can be general policies for all traffic that is transiting the provider network 130 and subscriber-specific policies that apply to an individual subscriber. The network processing node can analyze network traffic to determine a subscriber associated with the traffic and a type of the network traffic. For example, a source or destination network address of the traffic can be used as a key for a subscriber database, so that the network address can be used to obtain information about the subscriber. The information about the subscriber can include an International Mobile Equipment Identity (IMEI), a Mobile Station International Subscriber Directory Number (MSISDN), network policies, network usage data, subscriber device capabilities, subscriber preferences, and so forth. The network policies can include blacklists and/or whitelists of Uniform Resource Identifiers (URIs) and quotas and/or quality of service rules for various types of network traffic. For example, a minor child may have parental controls activated which may block URIs associated with gambling sites or other inappropriate content. As another example, a subscriber plan may allow voice and text messaging, but block streaming video. The network usage data can include an amount of network bandwidth used by a subscriber, an amount of network bandwidth remaining for a subscriber, and/or types of network that are allowed. For example, high-definition video may be enabled for a premium subscriber while only standard-definition video may be enabled for a non-premium subscriber. Each network processing node can perform analytics on the network traffic such as URIs that are visited, types of network traffic that are consumed, time of day when the network traffic is consumed, and so forth. The analysis can be used to update the subscriber information so that the network policies can be enforced and traffic can be managed in the provider network 130 and the intermediary server computer 110.

A network provider can have a priori knowledge of the subscribers and can use the a priori knowledge to balance the network traffic through the intermediary server computer 110. For example, when a new subscriber is added, the network provider can assign the new subscriber to a particular network processing node (e.g., the NPN 114B). As one example, the assignment can be based on the number of subscribers and/or the amount of network traffic processed by the particular network processing node relative to the other network processing nodes. As another example, the assignment can be based on a type of the subscriber, so that subscribers of the same type are processed on the same network processing node. The subscriber information can be loaded onto the assigned network processing node, and then the SDN switches 112A-B can be programmed to forward network traffic of the new subscriber to the assigned network processing node as it passes through the intermediary server computer 110. In this manner, the network traffic of the network provider (e.g., the network traffic of all of the subscribers) can be fairly evenly distributed (also referred to as disaggregated) among the different network processing nodes so that each of the network processing nodes is similarly loaded. However, the network traffic patterns may change as subscribers change their consumption of traffic and/or as subscribers are added or removed. Additionally, the network traffic may increase as subscribers consume more network traffic. Thus, new network processing nodes may be deployed to reduce the load on the individual network processing nodes and to reduce or prevent congestion in the intermediary server computer 110. One or more subscribers can be moved from being processed by one network processing node to a different network processing node (e.g., from the NPN 114B to the NPN 114C). To move a subscriber, the subscriber information for the subscriber can be copied to the new network processing node, and after the copy, the SDN switches 112A-B can be programmed to forward network traffic of the moved subscriber to the new network processing node as it passes through the intermediary server computer 110.

Figure 2:
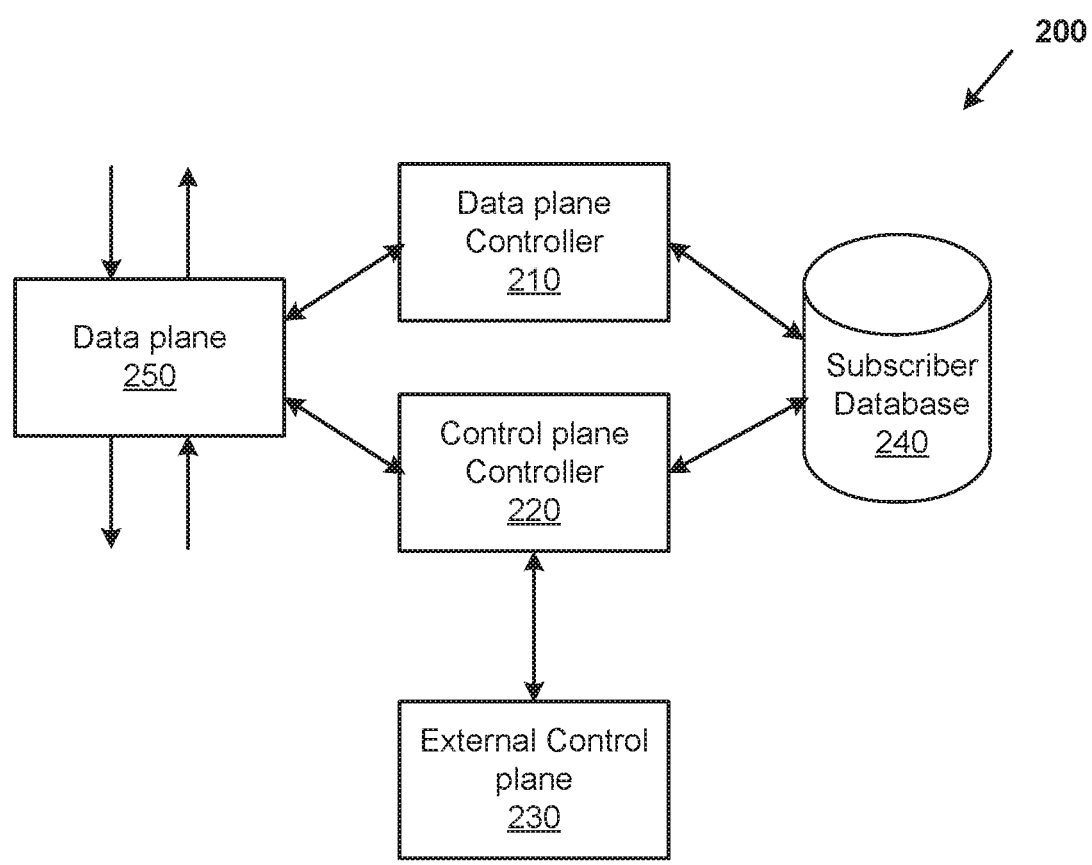
FIG. 2 is a block diagram of an example architecture for controlling network traffic in a subscriber-aware manner.

FIG. 2 is a block diagram of an example architecture 200 for controlling network traffic in a subscriber-aware manner. Specifically, FIG. 2 illustrates how an SDN architecture can be integrated with an external control-plane 230 to forward network traffic in a subscriber-aware manner. The architecture 200 can include a data plane controller 210, a control plane controller 220, an external control plane 230, a subscriber database 240, and a data plane 250. For example, the architecture 200 can be implemented using the architecture 100 of FIG. 1. Generally, the different components (210, 220, 230, 240, and 250) of the architecture 200 can be implemented using a computing environment as described in more detail with reference to FIG. 9.

The data plane controller 210 can be used to configure the SDN switches 112A-B. The SDN switches 112A-B are incorporated into the data plane 250 of the intermediary server computer 110, where the data plane 250 is used to forward network traffic through the intermediary server computer 110. The subscriber database 240 can be distributed among the NPN 114A-C, such that the respective network processors have local access to the subscriber information for the subscribers processed by the respective network processor. The data plane controller 210 can be implemented in various different ways. For example, the data plane controller 210 can be distributed among the NPN 114A-C, assigned to one of the NPN 114A-C, or be implemented on a separate server computer in communication with the NPN 114A-C.

The data plane 250 can be used to forward the network traffic of a subscriber to the network processing node where the subscriber information is stored. Specifically, the data plane 250 can use a network address to route a network packet to a network processing node. As one example, the data plane 250 can make the forwarding decision based only on the network address of the network packet. For example, the forwarding decision can be based on a source network address for network packets arriving from the provider network and the forwarding decision can be based on a destination network address for network packets arriving from an external network. Making a forwarding decision based only on the network address can potentially be more efficient than performing a deep packet inspection that uses multiple packet fields to make the forwarding decision. The data plane 250 can include network processing nodes (e.g., the NPN 114A-C) for processing network traffic received by the data plane 250. For example, the network processing nodes can implement subscriber-aware policies that are programmed by the control plane controller 220. For example, the network processing node can determine whether a particular packet will be forwarded based upon information within the packet and subscriber information. For example, some subscribers may have blacklisted URIs, and network packets from the subscriber and destined for one of the blacklisted URIs can be dropped at the network processing node. The data plane 250 can collect accounting or other status information related to the subscribers and send the information to the control plane controller 220 so that the subscriber database 240 can be updated based on the network traffic flowing through the data plane 250.

The control plane controller 220 can have a system level view of the network traffic that distinguishes between network packets of different subscribers and enables different networking policies to be implemented for the different subscribers. The control plane controller 220 can be implemented in various different ways. For example, the control plane controller 220 can be distributed among the NPN 114A-C, assigned to one of the NPN 114A-C, or be implemented on a separate server computer in communication with the NPN 114A-C. The control plane controller 220 can monitor the network traffic flowing through the data plane 250 and configure the data plane controller so that the network traffic is fairly evenly distributed among the different network processing nodes. Both the control plane controller 220 and the data plane controller 210 can process network packets using common information stored in the subscriber database 240. The control plane controller 220 can be in communication with the external control plane 230, the data plane controller 210, and the data plane 250. For example, the control plane controller 220 can aggregate and forward control plane messages to/from the external control plane 230, the data plane controller 210, and the data plane 250. The control plane controller 220 can monitor the utilization of the resources (e.g., the network processing nodes) of the data plane 250 and can determine when a resource is nearing a fully utilized condition. When a resource is at or near capacity, subscribers can be moved from the more utilized resource to different network processing nodes so that the overall load of the network traffic is distributed so as to reduce or eliminate network congestion through the data plane 250.

The external control plane 230 can be used to implement accounting and network policies of a network provider. The external control plane 230 can be implemented using one or more server computers in communication with the control plane controller 220. For example, the control plane controller 220 can include a 3GGP server, a PCRF server, and/or a RADIUS accounting server. The policies received from the external control plane 230 can impact how data flows through the data plane 250, and the control plane controller 220 can configure the data plane 250 (in coordination with the data plane controller 210) to efficiently process the network packets while implementing the policies. In other words, the control plane controller 220 can transform the network policies obtained from the external control plane 230 into actionable rules that are implemented by the network processing nodes of the data plane 250.

In comparison to an SDN architecture that implements a control plane controller 220 and a data plane controller 210, a distributed routing protocol is distributed among different network devices where each network device only has a limited information about the network traffic through the system. For example, a network device implementing a distributed routing protocol can make a routing decision based on local information at the network device and possibly information provided by neighbor devices. Thus, a distributed routing protocol does not make control decisions based on a system level view of the network traffic. Additionally, distributed routing protocols are implemented at the network level and do not have information about the subscribers.

Figure 3:
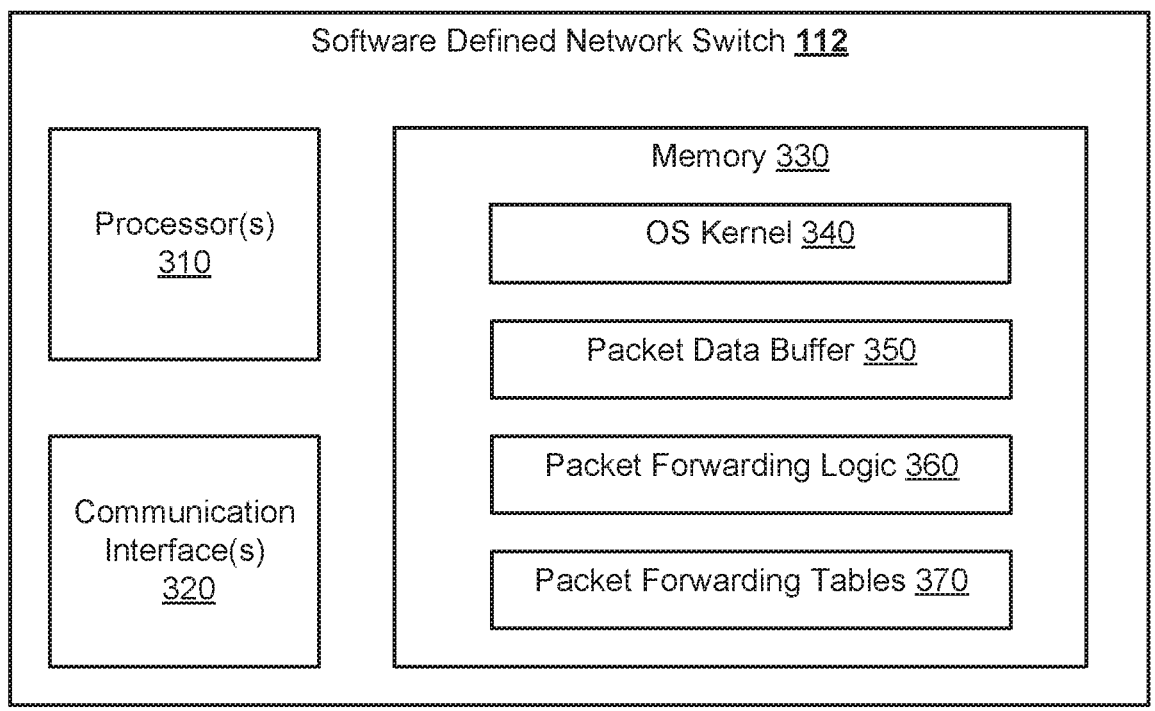
FIG. 3 is a block diagram of an example SDN switch.

FIG. 3 is a block diagram of an example SDN switch 112. The SDN switch 112 can be implemented using a computing environment as described in more detail with reference to FIG. 9. The SDN switch 112 can include one or more processor(s) 310, one or more communication interface(s) 320, and memory 330. The processor 310, communication interface 320, and the memory 330 can be coupled together with an interconnect (not shown) so that the components of the SDN switch 112 can communicate with each other using the interconnect. The communication interface 320 can be used to send and receive communications (e.g., network packets) with other computing devices, such as a subscriber client device, an application server, and a network processing node. The processor 310 can be used to execute computer-executable instructions that are stored in the memory 330 and/or storage resources (not shown). The computer-executable instructions can be organized into software routines (also referred to as modules or components) comprising executable code to perform various computing tasks. It should be noted that while FIG. 3 illustrates one organization of routines, other organizations are possible. For example, the illustrated routines can be sub-divided into smaller routines and/or combined into larger routines. The memory 330 can also include structured and/or unstructured data that is used by the software routines to perform the computing tasks.

The operating system (OS) kernel 340 can include different software routines for managing different aspects of the execution of programs and for interfacing with the hardware of the SDN switch 112. For example, the OS kernel 340 can manage the loading and removal of software applications and other routines into the memory 330 of the SDN switch 112; the OS kernel 340 can manage storage resources of the SDN switch 112; the OS kernel 340 can manage processes and/or threads executing on the processor 310; the OS kernel 340 can manage power states of the SDN switch 112; the OS kernel 340 can provide an interface for applications and other routines to send and receive communications (e.g., network packets) using the communications interface 320; and the OS kernel 340 can enable interprocess communication between different routines executing on the SDN switch 112.

The SDN switch 112 can send and receive network packets. Specifically, the SDN switch 112 can receive network packets from a provider network (e.g., from subscriber devices connected to the provider network) and from an external network (e.g., from the Internet). The received network packets can be stored in the packet data buffer 350 while the network packets are processed by the SDN switch 112. Processing the network packets can include determining whether and where to forward the received network packets. For example, the packet forwarding tables 370 can include rules and actions for controlling and directing packet flows. A rule can be programmed by a control plane controller, for example. The rules can specify how a flow or a partial flow are identified. For example, one packet flow can include all of the network packets that originate from a single source (e.g., from a network address of a particular subscriber). The rule to specify a packet flow that originates from a single source can specify a network address or a range of network addresses of the source. Another packet flow can include all of the network packets that either originate or terminate at a single source. Two rules can be used to identify a packet flow that originates or terminates at a single source. A first rule can specify a source network address for the originating source, and a second rule can specify a destination network address for the source. Each rule can have a corresponding action associated with the rule. For example, the action can be forwarding instructions for network packets that match the rule. As a specific example, a flow originating from subscriber device can be forwarded to a network processing node that is in communication with the SDN switch 112 and is assigned to further process network packets of the flow. A flow that is intended to reach the subscriber device (e.g., the destination network address is a network address of the subscriber) can be forwarded to the network processing node that is assigned to process network packets of the flow. The packet forwarding logic 360 can apply the rules that are programmed in the packet forwarding tables 370 to network packets that are received by the SDN switch 112. Specifically, the packet forwarding logic 360 can parse the incoming packets to determine various fields of the packets, and determine which, if any, of the rules match the incoming packet. When a match is found, the action associated with the rule can be applied.

Figure 4:
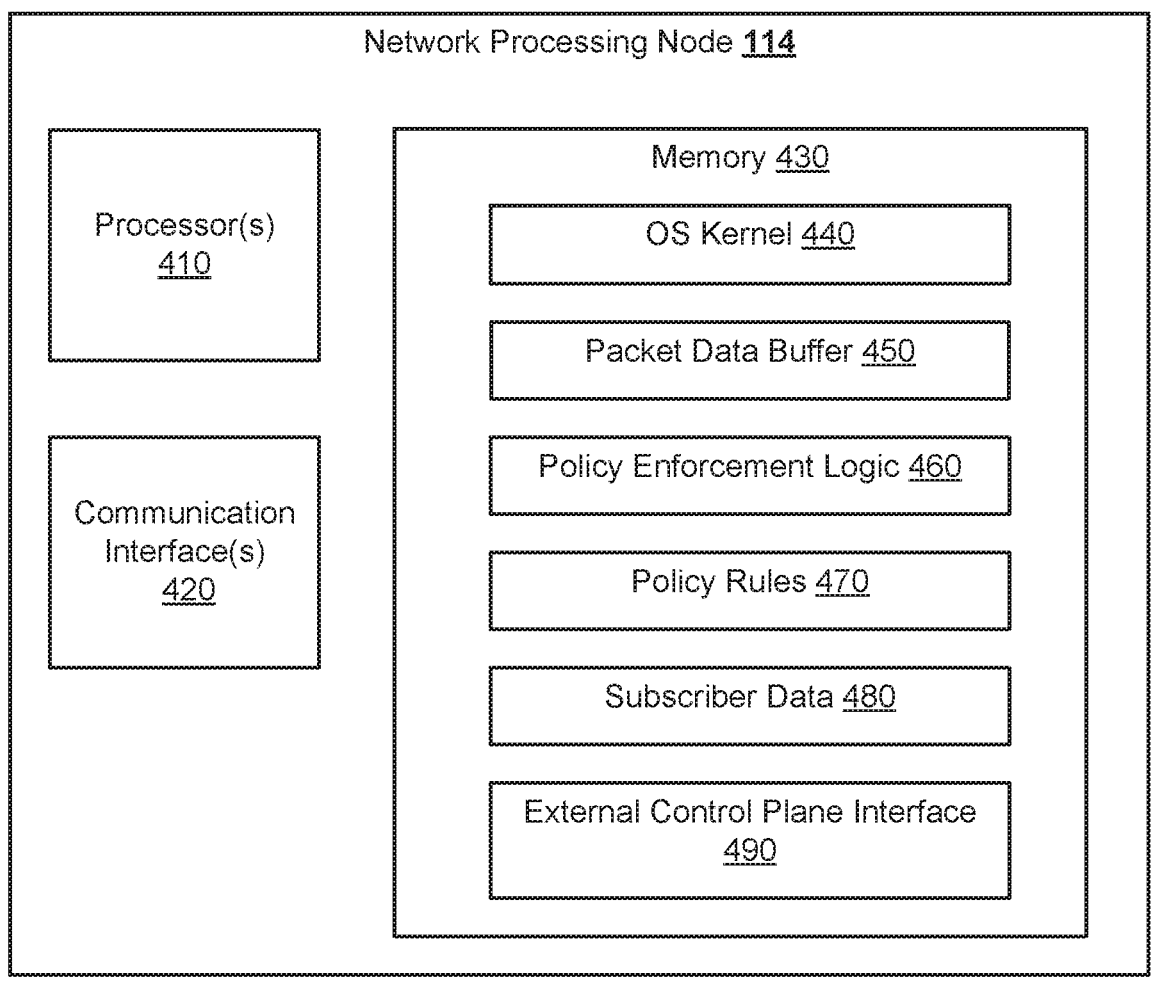
FIG. 4 is a block diagram of an example network processing node.

FIG. 4 is a block diagram of an example network processing node 114. The network processing node 114 can be implemented using a computing environment as described in more detail with reference to FIG. 9. The network processing node 114 can include one or more processor(s) 410, one or more communication interface(s) 420, and memory 430. The processor 410, communication interface 420, and the memory 430 can be coupled together with an interconnect (not shown) so that the components of the network processing node 114 can communicate with each other using the interconnect. The communication interface 420 can be used to send and receive communications (e.g., network packets) with other computing devices, such as a subscriber client device, an application server, and an SDN switch. The processor 410 can be used to execute computer-executable instructions that are stored in the memory 430 and/or storage resources (not shown). The computer-executable instructions can be organized into software routines (also referred to as modules or components) comprising executable code to perform various computing tasks. It should be noted that while FIG. 4 illustrates one organization of routines, other organizations are possible. For example, the illustrated routines can be sub-divided into smaller routines and/or combined into larger routines. The memory 430 can also include structured and/or unstructured data that is used by the software routines to perform the computing tasks.

The operating system (OS) kernel 440 can include different software routines for managing different aspects of the execution of programs and for interfacing with the hardware of the network processing node 114. For example, the OS kernel 440 can manage the loading and removal of software applications and other routines into the memory 430 of the network processing node 114; the OS kernel 440 can manage storage resources of the network processing node 114; the OS kernel 440 can manage processes and/or threads executing on the processor 410; the OS kernel 440 can manage power states of the network processing node 114; the OS kernel 440 can provide an interface for applications and other routines to send and receive communications (e.g., network packets) using the communications interface 420; and the OS kernel 440 can enable inter-process communication between different routines executing on the network processing node 114.

The network processing node 114 can send, receive, and process network packets. Specifically, the network processing node 114 can manage network traffic in a subscriber-aware manner. Network packets can be received by the network processing node 114 and stored in the packet data buffer 450. The network processing node 114 can parse the stored network packets to determine various information from the packet fields of network packets. For example, a source network address, a destination network address, a URI, and other information can be obtained from the packet by parsing the different layers (e.g., the network layer, the transport layer, the application layer, and so forth) of the packet. The parsed information can be used to determine a subscriber associated with the network packet. As a specific example, for packets originating from the provider network, the source network address can be used as a primary key for searching the subscriber data 480 to obtain a subscriber identity, data, and/or metadata associated with the subscriber. As another example, for packets originating from outside of the provider network, the destination network address can be used as a primary key for searching the subscriber data 480 to obtain a subscriber identity, data, and/or metadata associated with the subscriber. The network traffic of each subscriber can be controlled by a set of network policies. For example, the network policies can be based on the type of plan of the subscriber. Plan types can include unlimited amounts of data, restricted amounts of data for all types of data and/or certain types of data, and so forth. The network policies can be broken down into one or more policy rules 470. The subscriber data 480 can indicate which policy rules 470 apply to a given subscriber. The policy rules 470 can indicate whether and how to forward network packets of the subscriber. For example, one policy rule can specify that a maximum amount of network bandwidth can be used by the subscriber for a given amount of time. The subscriber data 480 can include an amount of data that the subscriber has used from the beginning of the measurement period. The policy enforcement logic 460 can apply the policy rules for the network packet stored in the packet data buffer 450. For example, the policy enforcement logic 460 can determine how much bandwidth a subscriber is used, how much bandwidth the subscriber is allocated, and whether forwarding the current packet of the subscriber would cause a subscriber to use more bandwidth than allocated. If the subscriber is out of bandwidth for the measurement period, the current packet of the subscriber can be dropped. Alternatively, if the subscriber has remaining bandwidth for the measurement period, the current packet of the subscriber can be forwarded toward the intended destination. The amount of bandwidth used by the current packet can be added to the total of the subscriber bandwidth used and stored in the subscriber data 480. Additionally, statistics and other information about the subscriber traffic can be sent to an external control plane using the external control plane interface 490. The external control plane interface 490 can also provide information about new subscribers that can be added to the subscriber data 480 and can update policy rules 470 at the direction of the provider.

Example Methods of Subscriber-Aware Network Controllers

Figure 5:
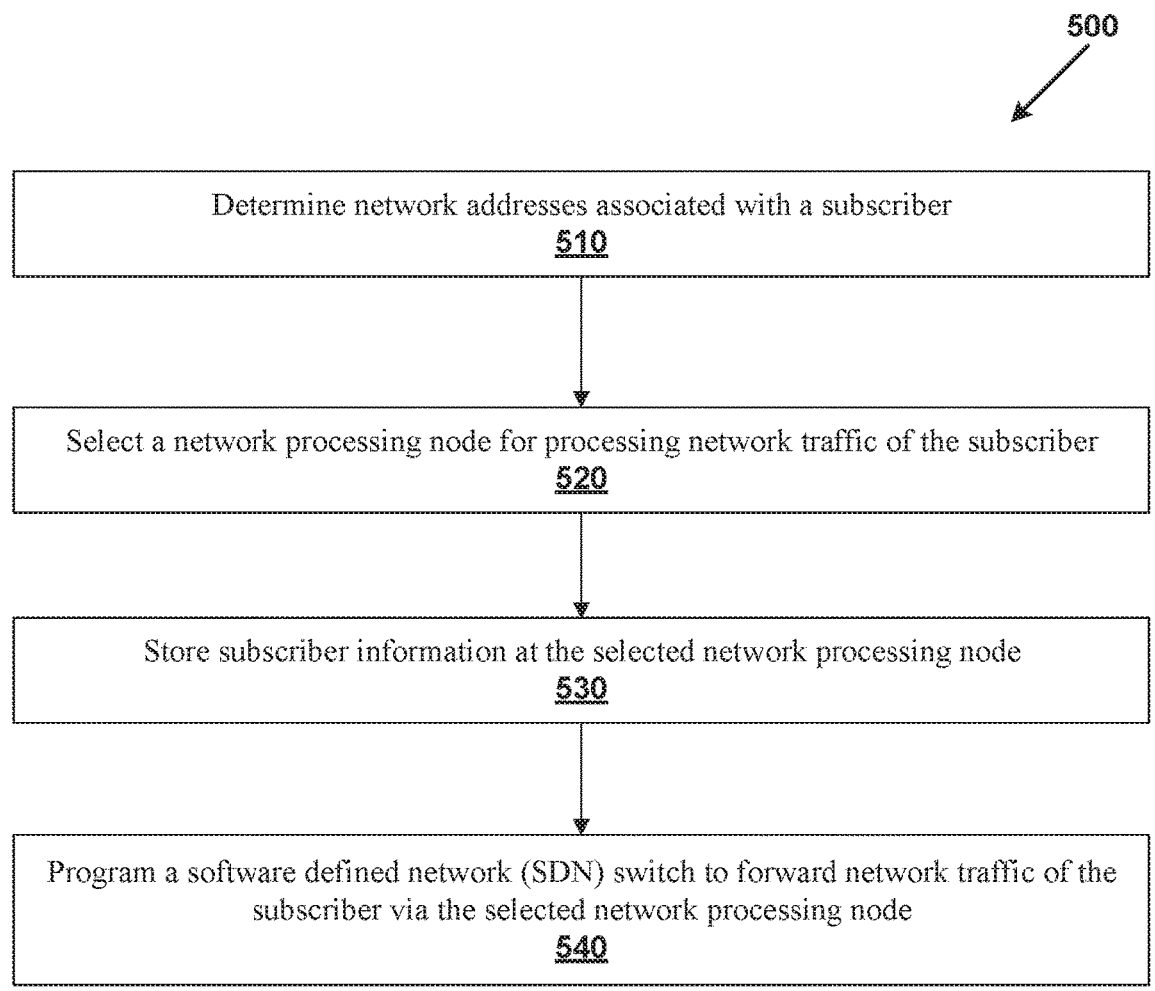
FIG. 5 is a flowchart of an example method for configuring a subscriber-aware network to add a new subscriber.

FIG. 5 is a flowchart of an example method 500 for configuring a subscriber-aware network to add a new subscriber. The method 500 can be implemented using the architecture 100, such as described above in reference to FIGS. 1-4. As one example, computer-executable instructions for carrying out the method 500 can be stored in computer-readable memories (e.g., the memories 330 and 430) and the instructions can be executed by one or more processor(s) (e.g., the processors 310 and 410) to perform the method 500.

At 510, network addresses associated with a subscriber can be determined. The subscriber can use multiple network addresses for a given subscriber device. For example, the provider network can implement a dual-stack implementation that forwards both IPv4 and IPv6 network packets through the network. The subscriber device can use both an IPv4 network address and an IPv6 network address. Additionally, the subscriber device can use different network addresses for different software programs executing on the subscriber device and/or for addressing devices that are connected to the subscriber device. For example, the subscriber device can act as a gateway for other devices of the subscriber and the gateway can pass network packets through the gateway while keeping source addresses that match the other devices. The network addresses associated with the subscriber can be within a continuous range and/or spread across different ranges.

At 520, a network processing node can be selected for processing network traffic of the subscriber. The network processing node can be selected based on a variety of different criteria. For example, the node can be selected based on a congestion and/or utilization of the different nodes. As one example, the least congested node can be selected for processing network traffic of the subscriber. As another example, the node having the lowest utilization (e.g., processor, network hardware, or memory utilization) can be selected for processing the network traffic of the subscriber. As another example, the node can be selected based on a number of subscribers that are assigned to each node. Specifically, the selected node can be the node with the fewest number of subscribers. As another example, the node can be selected based on a type of subscribers that have already been assigned to the node. Specifically, subscribers with similar subscription plans, and applying similar network policies, can be grouped together.

At 530, subscriber information can be stored at the selected network processing node. Each network processing node can include local memory and/or storage allocated for the subscriber information. By localizing the subscriber information, the subscriber information can be obtained relatively quickly and efficiently which can potentially increase the processing speed of the node. The subscriber information can include all of the network addresses associated with the subscriber, identifying information of the subscriber, a reference to network policies that apply to subscriber traffic, network usage information including an amount of data used and any quotas for all data and/or different types of data, and so forth. The subscriber information can be used to identify a network packets of the subscriber when the network packets are processed by the node. For example, the subscriber information can be stored so that the subscriber information can be retrieved using one of the network addresses of the subscriber. The subscriber information can be obtained from an external control plane when the subscriber is added to the provider network and/or when the subscriber information is updated. The subscriber information can be used to apply network policies of the subscriber to the network traffic of the subscriber.

At 540, an SDN switch can be programmed to forward network traffic of the subscriber via the selected network processing node. The network traffic of the subscriber can include network packets that originate at a subscriber device and/or network packets that are intended to terminate at the subscriber device (e.g., packets with a destination address matching the subscriber device network address). The SDN switch can be programmed by a data plane controller that provides information for programming a packet forwarding table. The packet forwarding table can include multiple entries, where each entry can include a rule and an action. The rule can specify the information used to identify a packet that is part of a particular packet flow. For example, one rule can specify that a network packet having a source address matching the network address of a subscriber belongs to the network traffic of the subscriber. When the rule is matched, the action can be performed by the SDN switch. For example, the action can specify that a matching packet is to be forwarded to the network processing node that is assigned for the subscriber.

Figure 6:
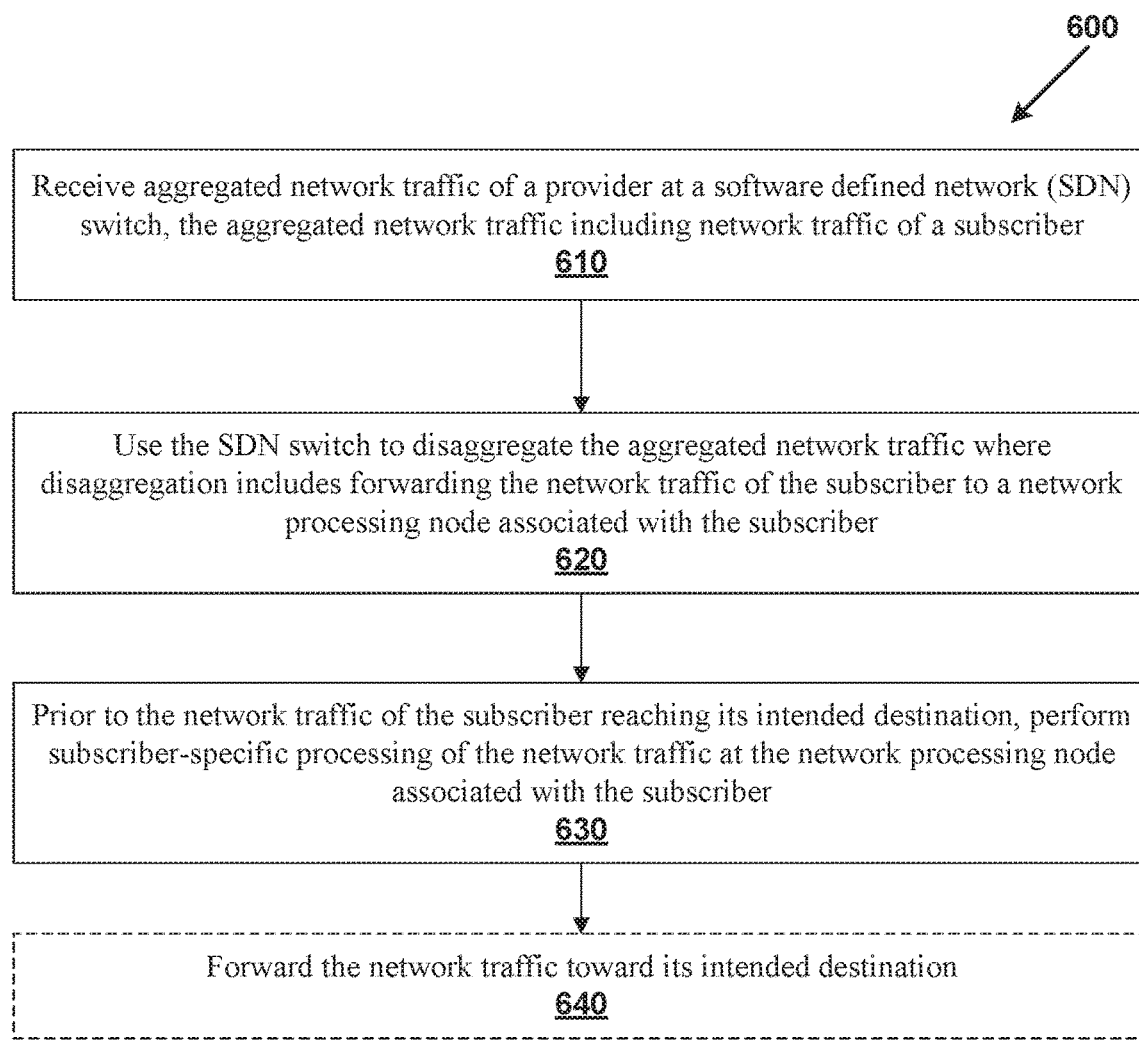
FIG. 6 is a flowchart of an example method for processing a network packet by a subscriber-aware network controller.

FIG. 6 is a flowchart of an example method 600 for processing a network packet by a subscriber-aware network controller. The method 600 can be implemented using the architecture 100, such as described above in reference to FIGS. 1-5. As one example, computer-executable instructions for carrying out the method 600 can be stored in computer-readable memories (e.g., the memories 330 and 430) and the instructions can be executed by one or more processor(s) (e.g., the processors 310 and 410) to perform the method 600.

At 610, aggregated network traffic of a provider can be received at an SDN switch. The aggregated network traffic can include network traffic of a subscriber. For example, the SDN switch can receive network traffic from a provider network that has multiple subscribers connected to the provider network. As one example, the different subscribers can be distinguished using network addresses of the network traffic. The SDN switch can be at either end of a gateway that connects a provider network to an external and/or public network. For example, one SDN switch can be connected to the provider network at a provider-network end of the gateway. As another example, another SDN switch can be connected to the external network at an external-network end of the gateway.

At 620, the SDN switch can be used to disaggregate the aggregated network traffic. Disaggregating the aggregated network traffic can include forwarding the network traffic of the subscriber to a network processing node associated with the subscriber. In this manner, network traffic from the different subscribers can be forwarded to the respective network processing nodes associated with each of the different subscribers. The forwarding decision can be based on a network address of the network traffic. For example, traffic originating from the subscribers can be forwarded based on a source network address of the network traffic, and traffic returning to the subscribers from the external network can be forwarded based on a destination network address of the network traffic. As one example, the forwarding decision can be based only on the source or destination network address.

At 630, prior to the network traffic of the subscriber reaching its intended destination, subscriber-specific processing of the network traffic can be performed at the network processing node associated with the subscriber. For example, the subscriber-specific processing can include processing the network traffic as the network traffic is being forwarded to the address specified by the destination network address. The processing can be transparent to the subscriber and/or the client device of the subscriber. The network processing node can identify the subscriber using a network address (e.g., either the source or the destination network address) of a network packet. For example, the network address can be used as a primary key to search the subscriber data to obtain identifying information of the subscriber, network policies that apply to the subscriber, and/or accounting information associated with the subscriber. The network processing node can identify a type of the network packet, such as by identifying a protocol and an application layer of the packet or identifying a port number in the transport layer of the packet, for example. As one example, different policies can apply to different types of network packets sent from and/or destined for a given subscriber. As a specific example, packets including voice data can be given priority over packets including other data. As another example, the network policy can limit the amount of voice data a subscriber can use in a given month, or other period of time, while allowing and unlimited amount of Short Message Service (SMS) data for the subscriber. The network processing node can identify additional information about a network packet, such as a URI sent over the HyperText Transfer Protocol (HTTP). A network policy can blacklist or whitelist certain URIs for a given subscriber. For example, children can be blocked from gambling websites. The network processing node can implement a network policy by blocking packets to blacklisted URIs and forwarding packets to whitelisted URIs. The network processing node can measure bandwidth of the network traffic for a given subscriber and update the subscriber database to include the amount of bandwidth used by the subscriber. The amount bandwidth use can be compared to a quota for the subscriber to determine whether network traffic of the subscriber will be forwarded. Additionally, statistics and/or other usage information can be collected for the different subscribers, used update the subscriber database, and/or provided to an external control plane.

At optional 640, the network traffic can be forwarded from the network processing node toward its intended destination. For example, when the network policy for the subscriber enables the network traffic to be sent, the network traffic can be forwarded. However, when the network policy for the subscriber does not enable the network traffic to be sent (such as when a quota for the subscriber has been met), the network traffic can be dropped.

Figure 7:
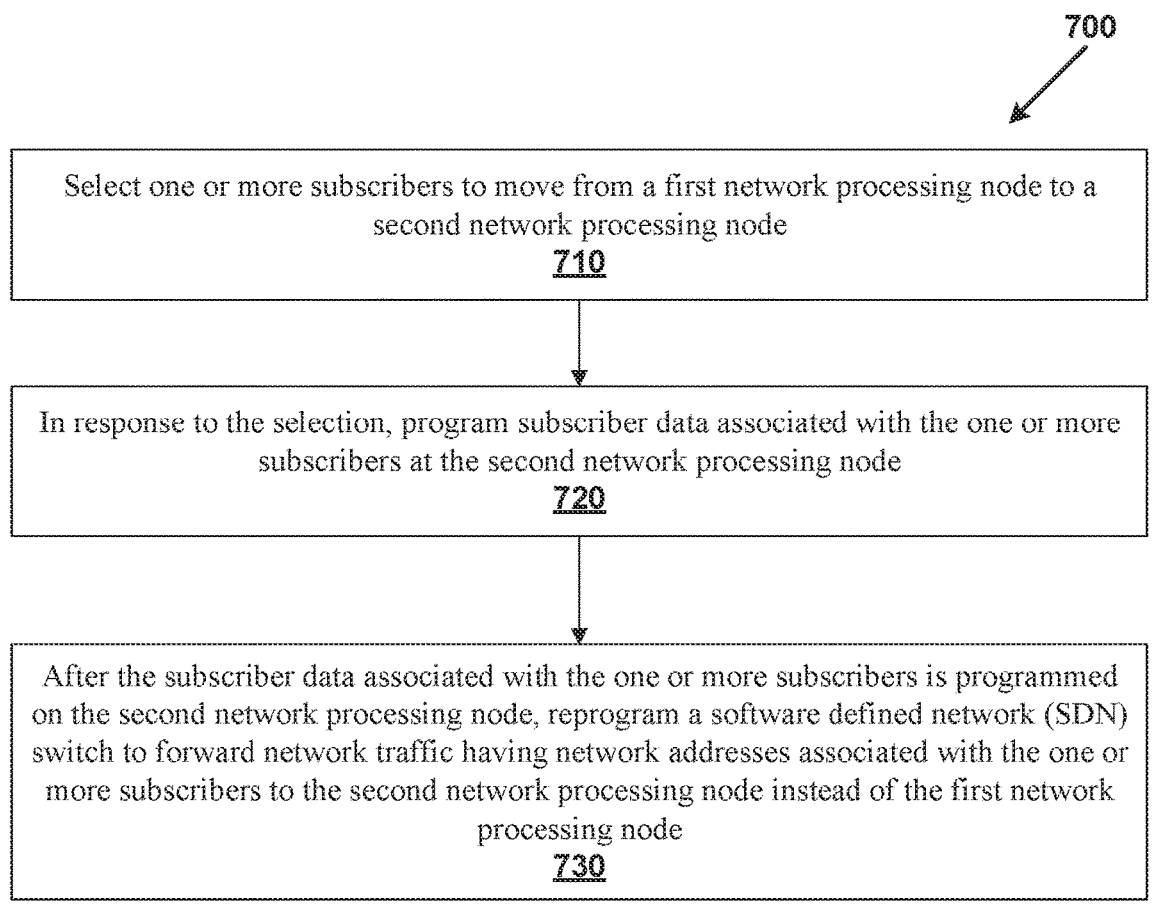
FIG. 7 is a flowchart of an example method for scaling a subscriber-aware network controller.

FIG. 7 is a flowchart of an example method for scaling a subscriber-aware network controller. The method 700 can be implemented using the architecture 100, such as described above in reference to FIGS. 1-6. As one example, computer-executable instructions for carrying out the method 700 can be stored in computer-readable memories (e.g., the memories 330 and 430) and the instructions can be executed by one or more processor(s) (e.g., the processors 310 and 410) to perform the method 700.

At 710, one or more subscribers can be selected to move from a first network processing node to a second network processing node. The selected subscribers can include a portion or subgroup of the subscribers that have network traffic processed on the first network processing node. For example, the subscribers can be selected based on an amount of bandwidth used by each of or the group of the subscribers, based on a common network policy of the subscribers, or based on another characteristic of the subscribers or the network traffic of the subscribers. The subscribers can be selected to move from the first network processing node to the second network processing node in response to a performance metric of the first network processing node exceeding a threshold. For example, the subscribers can be selected when a resource (e.g., a processor, memory, or a network interface) of the network processing mode is nearing capacity (e.g., such as 70% or 90% of capacity). As another example, the subscribers can be selected in response to additional network processing nodes being deployed and beginning service. The second network processing node can be selected based on the utilization of resources at the second node, an amount of time in service for the second node, and/or other performance criteria. For example, the selected subscribers can be moved from a relatively highly congested processing node to a more lightly loaded processing node.

At 720, in response to the selection, subscriber data associated with the one or more subscribers can be programmed at the second network processing node. The subscriber data can include all of the different network addresses used by the subscriber. For example, a given subscriber can be assigned multiple network addresses, such as when a dual stack implementation using IPv4 and IPv6 network addresses is used. The subscriber data can include subscriber identifying information such as an IMEI or a MSISDN number. The subscriber data can include network policies, accounting data, and other information related to the subscriber and the network traffic of the subscriber. The subscriber data can be programmed by storing the subscriber information in a table or other data structure that uses each of the network addresses of the subscriber as a key to obtain the subscriber information. Thus, a given subscriber can have multiple entries in a subscriber data structure, where each entry can correspond to a different network address of the subscriber. The subscriber data can be stored in a local resource of the second network processing node, such as memory or storage device.

At 730, after the subscriber data associated with the one or more subscribers is programmed on the second network processing node, an SDN switch can be reprogrammed to forward network traffic having network addresses associated with the one or more subscribers to the second network processing node instead of the first network processing node. Reprogramming the SDN switch can include updating a packet forwarding table. The packet forwarding table can have multiple entries, where each entry includes a rule and an action. The rule can specify how to identify a network packet that matches the rule. For example, the rule can specify a network address or a range of network addresses that match the rule. The action can specify an operation to perform on the network packet that matches the rule. Updating the packet forwarding table can include modifying, adding, or removing entries of the forwarding table. For example, the rules can be changed so that the network traffic of the selected subscribers are forwarded to the second network processing node and not the first network processing node.

Example Computing Environments

Figure 8:
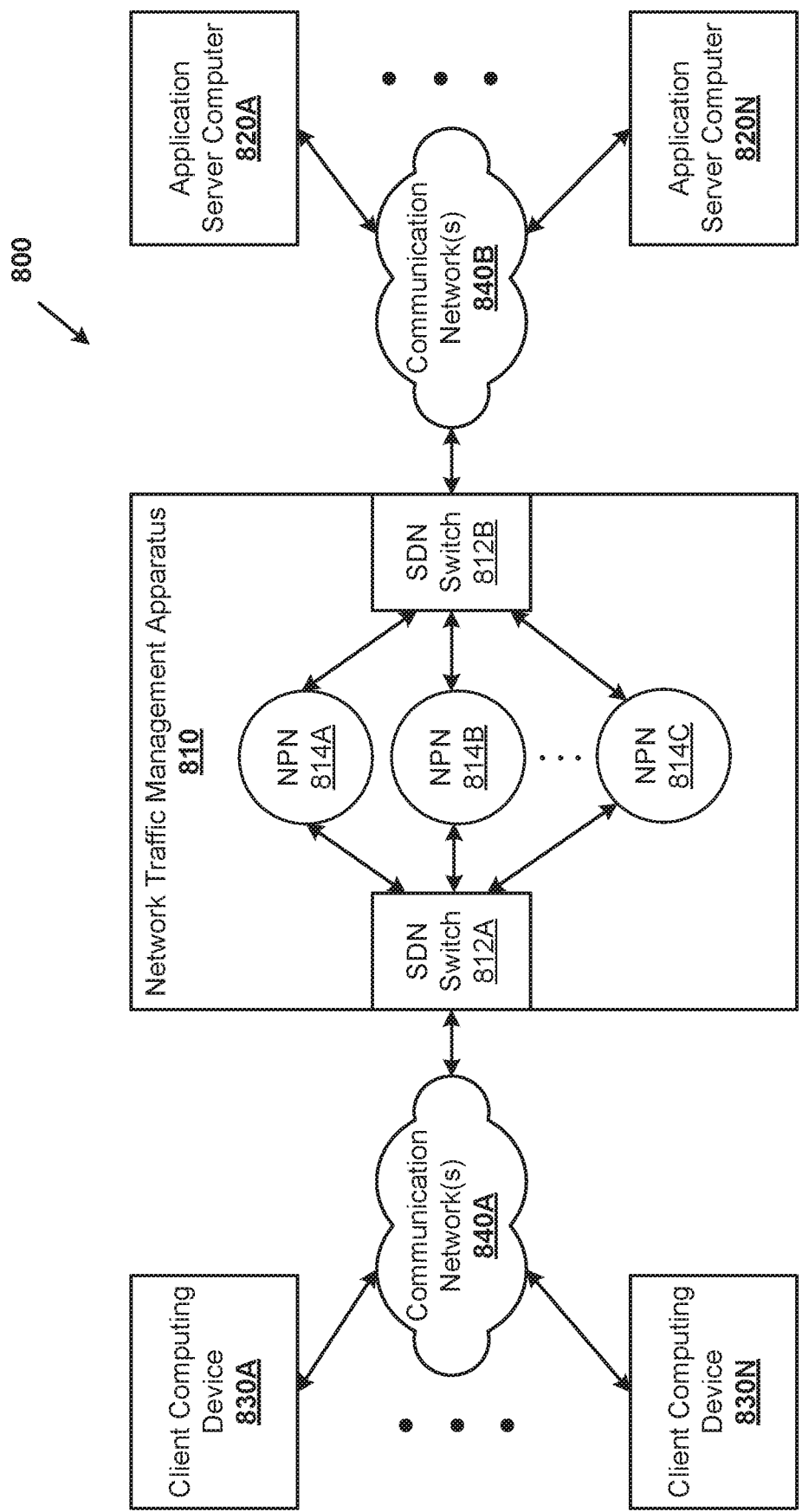
FIG. 8 is a block diagram of an example client-server architecture including a subscriber-aware network controller.

FIG. 8 illustrates an example client-server architecture 800 (also referred to as a network traffic management system) that incorporates a network traffic management apparatus 810. The client-server architecture 800 includes a network traffic management apparatus 810 that is coupled to one or more server computers (such as application server computers 820A-N) and one or more client devices (such as client computing devices 830A-N) via one or more communication networks (such as the communication networks 840A and 840B). Each of the client devices can be assigned to a subscriber. As one example, the communication network 840B can include a public network (e.g., the Internet) and devices attached to the network 840B can be accessed using public network addresses; the communication network 840A can include a private network (e.g., a provider network) and devices attached to the network 840A can be accessed using private network addresses.

The communication networks 840A-B can include various wired and/or wireless communication technologies, such as a local area network (LAN), a wide area network (WAN), an intranet, the Internet, a public switched telephone network (PSTN), and so forth. The devices connected to the communication networks 840A-B can communicate with each other using various communications protocols, such as transmission control protocol with Internet protocol (TCP/IP) over Ethernet and/or other customized or industry-standard protocols. The communication protocols can be used to transmit information over the networks 840A-B using packet-based messages (e.g., Ethernet-based packet data networks) and/or other application programming interfaces (APIs). An API is a programmatic interface (e.g., a set of methods and/or protocols) for communicating among different modules. The communication networks 840A-B can include various network devices, such as switches (multilayer or single-layer), routers, repeaters, gateways, network bridges, hubs, protocol converters, bridge routers, proxy servers, firewalls, network address translators, multiplexers, network interface controllers, wireless network interface controllers, modems, line drivers, and wireless access points, for example. As illustrated, the network traffic management apparatus 810 is positioned in-line between the client computing devices 830A-N and the server computers 820A-N so that the network traffic management apparatus 810 can intercept all network traffic flowing between the different networks 840A and 840B. In other examples, the network traffic management apparatus 810, the server computers 820A-N, and the client devices 830A-N can be coupled together via other topologies. As one specific example, the server computers 820A-N can be integrated within the network traffic management system 800 (e.g., server computer functions can be implemented in software within one or more devices of the network traffic management apparatus 810). It should be appreciated by one of ordinary skill in the art having the benefit of the present disclosure, that the network topology illustrated in FIG. 8 has been simplified and that multiple networks and networking devices can be utilized to interconnect the various computing systems disclosed herein. Additionally, one or more of the devices of the client-server architecture 800 in these examples can be in a same or a different communication network including one or more public, private, or cloud networks, for example.

Figure 9:
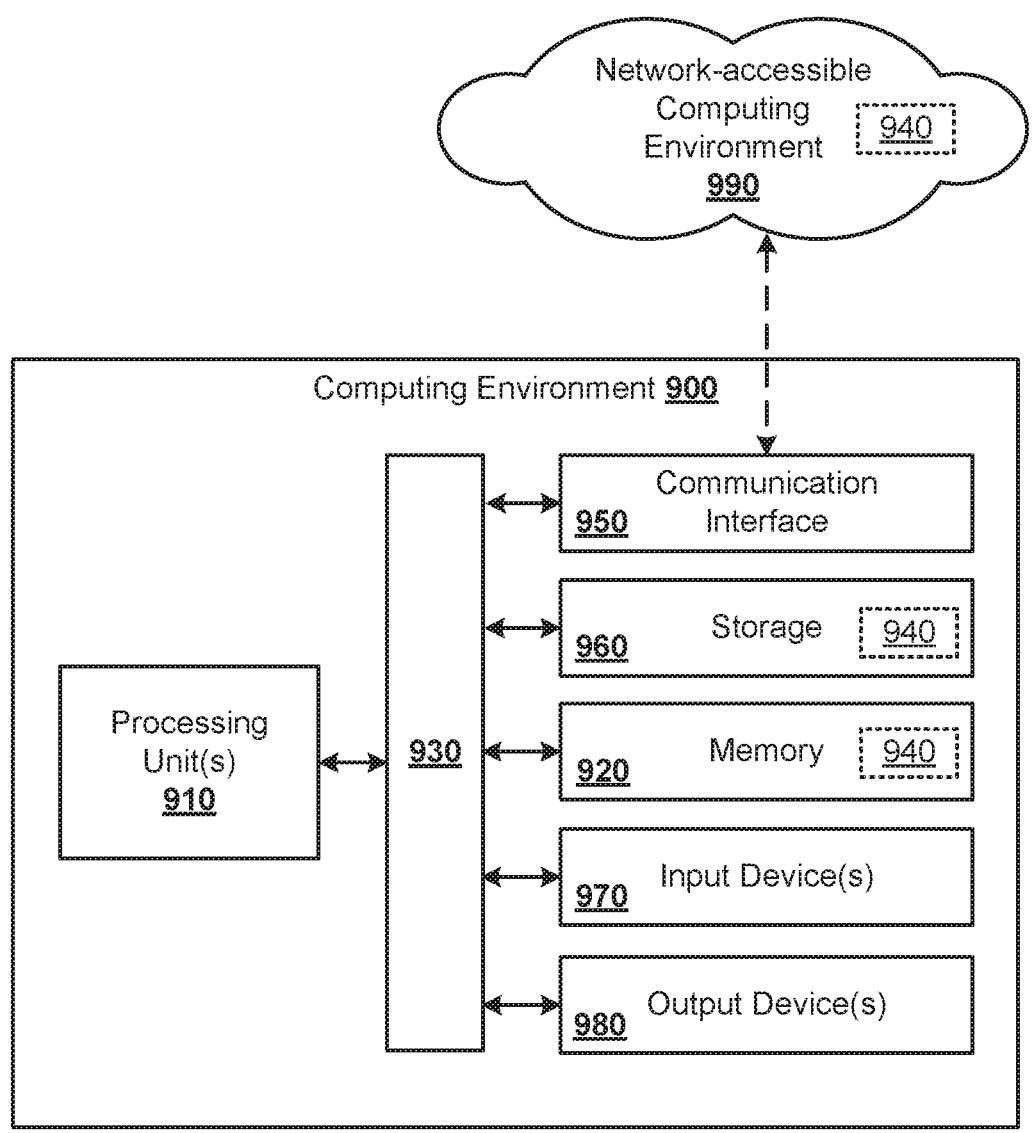
FIG. 9 is a block diagram of an example computing environment, such as can be used for a server computer.

Generally, the server computers 820A-N, the client devices 830A-N, and the network traffic management system 800 can perform various computing tasks that are implemented using a computing environment, such as the computing environment described in more detail with respect to FIG. 9. The computing environment can include computer hardware, computer software, and combinations thereof. As a specific example, the computing environment can include general-purpose and/or special-purpose processor(s), configurable and/or hard-wired electronic circuitry, a communications interface, and computer-readable memory for storing computer-executable instructions to enable the processor(s) to perform a given computing task. The logic to perform a given task can be specified within a single module or interspersed among multiple modules. As used herein, the terms "module" and "component" can refer to an implementation within one or more dedicated hardware devices or apparatus (e.g., computer(s)), and/or an implementation within software hosted by one or more hardware devices or apparatus that may be hosting one or more other software applications or implementations.

The client devices 830A-N can include any type of computing device that can exchange network data, such as mobile communication devices, laptop computers, desktop computers, tablet computers, virtual machines executing within a cloud-computer-based environment, and so forth. The client devices 830A-N can run interface applications, such as web browsers or standalone client applications, which may provide an interface to communicate with (e.g., make requests for, and receive content stored on) one or more of the server computers 820A-N via the communication network(s) 840A and 840B. The client devices 830A-N can further include an output device (such as a display screen or touchscreen (not illustrated)) and/or an input device (such as a keyboard (not illustrated)). Additionally, one or more of the client devices 830A-N can be configured to execute software code (e.g., JavaScript code within a web browser) in order to log client-side data and provide the logged data to the network traffic management apparatus 810 or the server computers 820A-N. Each client device can be associated with a particular subscriber.

The server computers 820A-N can include any type of computing device that can exchange network data. For example, the server computers 820A-N can exchange network data with the client devices 830A-N and with each other. As another example, the server computers 820A-N can exchange communications along communication paths specified by application logic in order to facilitate a client-server application interacting with the client devices 830A-N. Examples of the server computers 820A-N can include application servers, database servers, access control servers, and encryption servers. Accordingly, in some examples, one or more of the server computers 820A-N process login and other requests received from the client devices 830A-N via the communication network(s) 840A and 840B according to the Hypertext Transfer Protocol (HTTP) or Hypertext Transfer Protocol Secure (HTTPS) application-layer protocol. A web application may be operating on one or more of the server computers 820A-N and transmitting data (e.g., files or web pages) to the client devices 830A-N (e.g., via the network traffic management apparatus 810) in response to requests from the client devices 830A-N. The server computers 820A-N can be hardware and/or software and may represent a system with multiple servers in a pool, which may include internal or external networks.

While the server computers 820A-N are illustrated as single devices, one or more actions of each of the server computers 820A-N may be distributed across one or more distinct network computing devices that together comprise one or more of the server computers 820A-N. Moreover, the server computers 820A-N are not limited to a particular configuration. Thus, the server computers 820A-N may contain network computing devices that operate using a coordinated approach, whereby one of the network computing devices of the server computers 820A-N operate to manage or otherwise coordinate operations of the other network computing devices. Each of the server computers 820A-N can operate as a networked computing device within a cluster architecture, a computing device within a peer-to peer architecture, a virtual machine, or a resource within a cloud-based computer architecture, for example. Thus, the technology disclosed herein is not to be construed as being limited to a single environment and other configurations and architectures are also envisaged. For example, one or more of the server computers 820A-N can operate within the network traffic management apparatus 810 itself rather than as a stand-alone server device communicating with the network traffic management apparatus 810 via communication network 840B. In this example, the one or more of the server computers 820A-N operate within the memory of the network traffic management apparatus 810.

The network traffic management apparatus 810 can include any type of computing device that can be used for managing network traffic. The network traffic management apparatus 810 can perform a number of functions, including providing network security, access control, accounting, quality-of-service management, and/or load balancing network traffic across the client devices 830A-N and intermediary nodes between the client devices 830A-N and the communication network 840B, for example. Each of the functions can be performed by a service executed on a network processing node (e.g., NPN 814A-B). The services can be incorporated into workloads that are executed by the network traffic management apparatus 810. For example, the network traffic management apparatus 810 can include a workload that is used to perform proxy and other services on behalf of the client devices 830A-N and to manage traffic between the clients 830A-N and the servers 820A-N. Additionally, the network traffic management apparatus 810 can include other network devices such as one or more routers or switches, for example.

The network traffic management apparatus 810 can include logic for managing a provider network in a subscriber-aware manner as described above with reference to FIGS. 1-7. For example, the SDN switch 812A can receive network traffic of a subscriber that originated from one of the client devices 830A-N. The network traffic of the subscriber can be forwarded to a network processing node (e.g., NPN 814A-C) that is associated with and assigned to the subscriber. The assigned network processing node can process network traffic, such as by performing accounting operations and applying network policies associated with the subscriber. If the policy allows the network traffic to continue to its destination, the network processing node can forward the network traffic to the SDN switch 812B which can forward the network traffic onto the communication network 840B. Return traffic to the subscriber from the communication network 840B can be received by the SDN switch 812B. The SDN switch 812B can forward the return network traffic of the subscriber to the assigned network processing node of the subscriber. The network processing node can apply network policies and perform accounting operations for the return traffic and, network policy allowing, forward the network traffic through the SDN switch 812A and toward the client device of the subscriber.

While the network traffic management apparatus 810 is illustrated in this example as including a single system, the network traffic management apparatus 810 in other examples can include a plurality of devices or blades each having one or more processors (each processor with one or more processing cores) that implement one or more components of this technology. In these examples, one or more of the devices can have a dedicated communication interface or memory. Alternatively, one or more of the devices can utilize the memory, communication interface, or other hardware or software components of one or more other devices included in the network traffic management apparatus 810. Additionally, the network traffic management apparatus 810 and/or the application(s) executed by the network traffic management apparatus 810 can be operative in a cloud-based computing environment. The application(s) can be executed within or as virtual machine(s) or virtual server(s) that can be managed in a cloud-based computing environment. For example, the application(s), and even the network traffic management apparatus 810 itself, can be located in virtual server(s) running in a cloud-based computing environment rather than being tied to one or more specific physical network computing devices. Also, the application (s) can be running in one or more virtual machines (VMs) executing on the network traffic management apparatus 810. Additionally, in one or more examples of this technology, virtual machine(s) running on the network traffic management apparatus 810 can be managed or supervised by a hypervisor. Additionally, one or more of the components that together comprise the network traffic management apparatus 810 can be standalone devices or integrated with one or more other devices or apparatuses, such as with one or more of the server computers 820A-N, for example.

Additionally, one or more of the components depicted in the client-server architecture 800, such as the network traffic management apparatus 810, server computers 820A-N, or client computing devices 830A-N, for example, may be configured to operate as virtual instances on the same physical machine. In other words, one or more of the network traffic management apparatus 810, server computers 820A-N, or client computing devices 830A-N may operate on the same physical device rather than as separate devices communicating through communication networks 840A and 840B. Additionally, there may be more or fewer network traffic management apparatuses, client computing devices, or server computers than illustrated in FIG. 8.

FIG. 9 illustrates a block diagram of a generalized example of a suitable computing environment 900 that can be used to implement the examples, techniques, and technologies described herein. For example, the computing environment 900 can be used to implement a network traffic management apparatus including an intermediary server that performs the disclosed techniques for processing packets having returnable values.

The computing environment 900 includes at least one processing unit 910 and computer-readable memory 920, which are coupled together by an interconnect 930. The processing unit 910 executes computer-executable instructions. The processing unit 910 can include a general-purpose processor, a special-purpose processor, and combinations thereof. For example, the processing unit 910 can include a general-purpose central processing unit (CPU), a graphics processor, a processor in an application-specific integrated circuit (ASIC), a processor configured to operate using programmable logic (such as in a field-programmable gate array (FPGA)), and/or any other type of processor. In a multi-processing system, multiple processing units can be used to execute computer-executable instructions to increase processing power.

The memory 920 stores software 940 implementing one or more innovations described herein, in the form of computer-executable instructions suitable for execution by the processing unit 910. Specifically, the memory 920 can be used to store computer-executable instructions, data structures, input data, output data, and other information. The memory 920 can include volatile memory (e.g., registers, cache, random-access memory (RAM)), non-volatile memory (e.g., read-only memory (ROM), electrically-erasable programmable ROM (EEPROM), and flash memory), and/or combinations thereof. The memory 920 can include operating system software (not illustrated). Operating system software can provide an operating environment for other software executing in the computing environment 900 and can coordinate activities of the components of the computing environment 900.

The interconnect 930 is used to connect different components of the computing environment 900 together so that the processing unit 910 can communicate with the different components and/or so that the different components can communicate with each other. For example, the interconnect 930 can include a bus, controller, and/or a network. As one example, the interconnect 930 can include a host bridge (also referred to as a northbridge) for connecting the processing unit 910 to relatively high-speed components (such as the memory 920) and an input/output bridge (also referred to as a southbridge) for connecting to relatively lower-speed components (such as a communications interface 950) within the computing environment 900. In some examples, one or more components of the computing environment 900 can be integrated within or connected directly to the processing unit 910.

The computing environment 900 can include a communication interface 950 for communicating with another computing entity using a communication medium (e.g., a physical layer). The communication interface 950 can implement all or a portion of a network protocol stack. The network protocol stack defines communication formats and rules for communicating between different devices connected to a network. For example, the network protocol stack can define modular layers for communication using the Open Systems Interconnection (OSI) model or another model. The OSI model standardizes and partitions a communication system into seven layers including a physical layer (referred to as layer 1) and an application layer (referred to as layer 7). The application layer can be used to define how applications access the communications subsystem. The physical layer defines the electrical and physical specifications for communication over a communication medium (also referred to as a physical transmission medium). The communication medium can be used to convey information, such as computer-executable instructions or other data, in a modulated data signal. A modulated data signal is a signal that has one or more of its characteristics adjusted in such a manner as to encode information in the signal. The communication interface 950 can include electronic and/or optical circuitry to receive and transmit communications signals that are encoded (e.g., according to a physical layer specification of the network stack) using an electrical, optical, radio-frequency (RF), or another carrier signal. Accordingly, the communication interface 950 can be used to communicate over wired connections (e.g., twisted-wire pair, coaxial cable, and fiber optic connections) and/or wireless technologies (e.g., Bluetooth, WiFi (IEEE 802.11), and cellular). As a specific example with reference to FIG. 8, a communication interface of the network traffic management apparatus 810 operatively couples to and communicates with the communication networks 840A and 840B so that the network traffic management apparatus 810 is coupled to and can communicate with the server computers 820A-N and the client computing devices 830A-N.

The computing environment 900 can include storage 960 that is used to store instructions for the software 940, data structures, and data, which can be used to implement the technologies described herein. The storage 960 can include electronic circuitry for reading and/or writing to removable or non-removable storage media using magnetic, optical, or other reading and writing system that is coupled to the processor. The storage 960 can include read-only storage media and/or readable and writeable storage media, such as magnetic disks, solid state drives, magnetic tapes or cassettes, CD-ROMs, CD-RWs, DVDs, or any other medium which can be used to store information and that can be accessed within the computing environment 900.

The computing environment 900 can include input device(s) 970. For example, the input device(s) 970 can provide an input interface to a user of the computing environment 900 and/or to receive inputs from a physical environment. The input device(s) 970 can include a tactile input device (e.g., a keyboard, a mouse, or a touchscreen), a microphone, a camera, a sensor, or another device that provides input to the computing environment 900.

The computing environment 900 can include output device(s) 980. For example, the output device(s) 980 can provide an output interface to a user of the computing environment 900 and/or to generate an output observable in a physical environment. The output device(s) 980 can include a light-emitting diode, a display, a printer, a speaker, a CD-writer, or another device that provides output from the computing environment 900. In some examples, the input device(s) 970 and the output device(s) 980 can be used together to provide a user interface to a user of the computing environment 900.

The computing environment 900 is not intended to suggest limitations as to scope of use or functionality of the technology, as the technology can be implemented in diverse general-purpose and/or special-purpose computing environments. For example, the disclosed technology can be practiced in a local, distributed, and/or network-enabled computing environment. In distributed computing environments, tasks are performed by multiple processing devices. Accordingly, principles and advantages of distributed processing, such as redundancy, parallelization, and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof. As a specific example, a distributed computing environment can include the processing unit 910 and the network-accessible computing environment 990 that is linked through a communications network. In a distributed computing environment, program modules 940 (including executable instructions for controlling a network in a subscriber-aware manner) can be located in both local and remote memory storage devices.

The term computer-readable media includes non-transient media for data storage, such as memory 920 and storage 960, and does not include transmission media such as modulated data signals and carrier waves. Any of the disclosed methods can be implemented as computer-executable instructions stored on one or more computer-readable media and executed on a computer (e.g., any commercially available computer). Any of the computer-executable instructions for implementing the disclosed techniques as well as any data structures and data created and used during implementation of the disclosed embodiments can be stored on one or more computer-readable storage media. For example, the computer-executable instructions can be part of a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, or other such network) using one or more network-attached computers.

This disclosure is set forth in the context of representative examples that are not intended to be limiting. Accordingly, this disclosure is directed toward all novel and non-obvious features and aspects of the various disclosed examples, alone and in various combinations and sub-combinations with one another. Many variations of the specific hardware and software used to implement the examples are possible, as will be appreciated by those skilled in the relevant art with the benefit of this disclosure. The disclosed systems, methods, and apparatus are not limited to any specific aspect or feature or combinations thereof, nor does the disclosed technology require that any one or more specific advantages be present or problems be solved. Theories of operation, scientific principles, or other theoretical descriptions presented herein in reference to the disclosed technology have been provided for the purposes of better understanding and are not intended to be limiting in scope. The apparatus and methods in the appended claims are not limited to those apparatus and methods that function in the manner described by such theories of operation.

As used in this application the singular forms "a," "an," and "the" include the plural forms unless the context clearly dictates otherwise. The term "coupled" encompasses mechanical, electrical, magnetic, optical, as well as other practical ways of coupling or linking items together, and does not exclude the presence of intermediate elements between the coupled items. The term "and/or" means any one item or combination of items in the phrase.

The recited order of processing elements or sequences, or the use of numbers, letters, or other designations therefore, is not intended to limit the claimed processes to any order. Although the operations of some of the disclosed methods are described in a particular, sequential order for convenient presentation, it should be understood that this manner of description encompasses rearrangement, unless a particular ordering is required by specific claim language set forth below. For example, operations described sequentially may in some cases be rearranged or performed concurrently. Moreover, for the sake of simplicity, the attached figures may not show all of the various ways in which the disclosed methods can be used in conjunction with other methods.

It should also be well understood that any software functionality described herein can be performed, at least in part, by one or more hardware logic components, instead of software. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so forth.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Having thus described many possible embodiments to which the principles of the invention may be applied, it will be recognized by those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the scope of the claimed subject matter is defined by the following claims. We therefore claim as our invention all that comes within the scope of these claims.

What is claimed is:

1. A method implemented by a network traffic management system comprising one or more software defined networking switches, network processing nodes, server devices, or client devices, the method comprising:
    programming subscriber data associated with one or more subscribers at a first network processing node, of a plurality of network processing nodes, wherein the programming the subscriber data associated with one or more subscribers at the first network processing node comprises updating a subscriber database that is distributed among the plurality of network processing nodes such that the first network processing node has local access to the subscriber data associated with the one or more subscribers;
    programming a software defined networking (SDN) switch that is connected to the plurality of network processing nodes to forward network traffic having network addresses associated with the one or more subscribers to the first network processing node;
    selecting the one or more subscribers to move from the first network processing node to a second network processing node of the plurality of network processing nodes;
    in response to the selection, programming the subscriber data associated with the one or more subscribers at the second network processing node, wherein the programming the subscriber data associated with the one or more subscribers at the second network processing node comprises updating the subscriber database that is distributed among the plurality of network processing nodes such that the second network processing node has local access to the subscriber data associated with the one or more subscribers; and
    after the subscriber data associated with the one or more subscribers is programmed on the second network processing node, reprogramming the SDN switch to forward network traffic having the network addresses associated with the one or more subscribers to the second network processing node instead of the first network processing node.

2. The method of claim 1, further comprising:
    receiving aggregated network traffic at the SDN switch;
    using the SDN switch to disaggregate the aggregated network traffic including forwarding network traffic of the one or more subscribers to the second network processing node; and prior to the network traffic of the one or more subscribers reaching its intended destination, processing the network traffic of the one or more subscribers at the second network processing node.

3. The method of claim 1, wherein the network addresses associated with the one or more subscribers comprise an Internet Protocol version four (IPv4) address and an Internet Protocol version six (IPv6) address, and wherein reprogramming the SDN switch to forward network traffic having the network addresses associated with the one or more subscribers to the second network processing node causes both IPv4 network traffic and IPv6 network traffic of the one or more subscribers to be processed by the second network processing node.

4. The method of claim 1, wherein the one or more subscribers are selected to move from the first network processing node to the second network processing node in response to a performance metric of the first network processing node exceeding a threshold.

5. The method of claim 1, wherein reprogramming the SDN switch comprises programming a forwarding table of the SDN switch.

6. A system comprising one or more network traffic management modules, networking modules, or server modules, memory comprising programmed instructions stored thereon, and one or more processors configured to be capable of executing the stored programmed instructions to:
program subscriber data associated with one or more subscribers at a first network processing node, of a plurality of network processing nodes, wherein the programming the subscriber data associated with one or more subscribers at the first network processing node comprises updating a subscriber database that is distributed among the plurality of network processing nodes such that the first network processing node has local access to the subscriber data associated with the one or more subscribers;
program a software defined networking (SDN) switch that is connected to the plurality of network processing nodes to forward network traffic having network addresses associated with the one or more subscribers to the first network processing node;
select the one or more subscribers to move from the first network processing node to a second network processing node of the plurality of network processing nodes;
in response to the selection, program the subscriber data associated with the one or more subscribers at the second network processing node, wherein the programming the subscriber data associated with the one or more subscribers at the second network processing node comprises updating the subscriber database that is distributed among the plurality of network processing nodes such that the second network processing node has local access to the subscriber data associated with the one or more subscribers; and
after the subscriber data associated with the one or more subscribers is programmed on the second network processing node, reprogram the SDN switch to forward network traffic having the network addresses associated with the one or more subscribers to the second network processing node instead of the first network processing node.

7. The system of claim 6, wherein the one or more processors are further configured to be capable of executing the stored programmed instructions to:
receive aggregated network traffic at the SDN switch;
use the SDN switch to disaggregate the aggregated network traffic including forwarding network traffic of the one or more subscribers to the second network processing node; and
prior to the network traffic of the one or more subscribers reaching its intended destination, process the network traffic of the one or more subscribers at the second network processing node.

8. The system of claim 6, wherein the network addresses associated with the one or more subscribers comprise an Internet Protocol version four (IPv4) address and an Internet Protocol version six (IPv6) address, and wherein reprogramming the SDN switch to forward network traffic having the network addresses associated with the one or more subscribers to the second network processing node causes both IPv4 network traffic and IPv6 network traffic of the one or more subscribers to be processed by the second network processing node.

9. The system of claim 6, wherein the one or more subscribers are selected to move from the first network processing node to the second network processing node in response to a performance metric of the first network processing node exceeding a threshold.

10. The system of claim 6, wherein reprogramming the SDN switch comprises programming a forwarding table of the SDN switch.

11. A non-transitory computer readable medium having stored thereon instructions comprising executable code that, when executed by one or more processors, causes the processors to:
program subscriber data associated with one or more subscribers at a first network processing node, of a plurality of network processing nodes, wherein the programming the subscriber data associated with one or more subscribers at the first network processing node comprises updating a subscriber database that is distributed among the plurality of network processing nodes such that the first network processing node has local access to the subscriber data associated with the one or more subscribers;
program a software defined networking (SDN) switch that is connected to the plurality of network processing nodes to forward network traffic having network addresses associated with the one or more subscribers to the first network processing node;
select the one or more subscribers to move from the first network processing node to a second network processing node of the plurality of network processing nodes;
in response to the selection, program the subscriber data associated with the one or more subscribers at the second network processing node, wherein the programming the subscriber data associated with the one or more subscribers at the second network processing node comprises updating the subscriber database that is distributed among the plurality of network processing nodes such that the second network processing node has local access to the subscriber data associated with the one or more subscribers; and
after the subscriber data associated with the one or more subscribers is programmed on the second network processing node, reprogram the SDN switch to forward network traffic having the network addresses associated with the one or more subscribers to the second network processing node instead of the first network processing node.

12. The computer readable medium of claim 11, further comprising executable code that, when executed by one or more processors, causes the processors to:

receive aggregated network traffic at the SDN switch;

use the SDN switch to disaggregate the aggregated network traffic including forwarding network traffic of the one or more subscribers to the second network processing node; and prior to the network traffic of the one or more subscribers reaching its intended destination, process the network traffic of the one or more subscribers at the second network processing node.

13. The computer readable medium of claim 11, wherein the network addresses associated with the one or more subscribers comprise an Internet Protocol version four (IPv4) address and an Internet Protocol version six (IPv6) address, and wherein reprogramming the SDN switch to forward network traffic having the network addresses associated with the one or more subscribers to the second network processing node causes both IPv4 network traffic and IPv6 network traffic of the one or more subscribers to be processed by the second network processing node.

14. The computer readable medium of claim 11, wherein the one or more subscribers are selected to move from the first network processing node to the second network processing node in response to a performance metric of the first network processing node exceeding a threshold.

15. The computer readable medium of claim 11, wherein reprogramming the SDN switch comprises programming a forwarding table of the SDN switch.

16. A network traffic management apparatus, comprising memory comprising programmed instructions stored thereon and one or more processors configured to be capable of executing the stored programmed instructions to:

program subscriber data associated with one or more subscribers at a first network processing node, of a plurality of network processing nodes, wherein the programming the subscriber data associated with one or more subscribers at the first network processing node comprises updating a subscriber database that is distributed among the plurality of network processing nodes such that the first network processing node has local access to the subscriber data associated with the one or more subscribers;

program a software defined network (SDN) switch that is connected to the plurality of network processing nodes to forward network traffic having network addresses associated with the one or more subscribers to the first network processing node;

select the one or more subscribers to move from the first network processing node to a second network processing node of the plurality of network processing nodes;

in response to the selection, program the subscriber data associated with the one or more subscribers at the second network processing node, wherein the programming the subscriber data associated with the one or more subscribers at the second network processing node comprises updating the subscriber database that is distributed among the plurality of network processing nodes such that the second network processing node has local access to the subscriber data associated with the one or more subscribers; and after the subscriber data associated with the one or more subscribers is programmed on the second network processing node, reprogram the SDN switch to forward network traffic having the network addresses associated with the one or more subscribers to the second network processing node instead of the first network processing node.

17. The network traffic management apparatus of claim 16, wherein the one or more processors are further configured to be capable of executing the stored programmed instructions to:

receive aggregated network traffic at the SDN switch;

use the SDN switch to disaggregate the aggregated network traffic including forwarding network traffic of the one or more subscribers to the second network processing node; and prior to the network traffic of the one or more subscribers reaching its intended destination, process the network traffic of the one or more subscribers at the second network processing node.

18. The network traffic management apparatus of claim 16, wherein the network addresses associated with the one or more subscribers comprise an Internet Protocol version four (IPv4) address and an Internet Protocol version six (IPv6) address, and wherein reprogramming the SDN switch to forward network traffic having the network addresses associated with the one or more subscribers to the second network processing node causes both IPv4 network traffic and IPv6 network traffic of the one or more subscribers to be processed by the second network processing node.

19. The network traffic management apparatus of claim 16, wherein the one or more subscribers are selected to move from the first network processing node to the second network processing node in response to a performance metric of the first network processing node exceeding a threshold.

20. The network traffic management apparatus of claim 16, wherein reprogramming the SDN switch comprises programming a forwarding table of the SDN switch.

* * * * *